United States Patent
Guo et al.

(10) Patent No.: US 10,209,898 B2
(45) Date of Patent: Feb. 19, 2019

(54) ESTIMATION OF PERFORMANCE UTILIZATION OF A STORAGE DEVICE

(71) Applicant: INTERNATIONAL BUSINESS MACHINES CORPORATION, Armonk, NY (US)

(72) Inventors: Yong Guo, Shanghai (CN); Bruce McNutt, Gilroy, CA (US); Jie Tian, Shanghai (CN); Yan Xu, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 56 days.

(21) Appl. No.: 14/244,107

(22) Filed: Apr. 3, 2014

(65) Prior Publication Data

US 2015/0286419 A1 Oct. 8, 2015

(51) Int. Cl.
*G06F 12/00* (2006.01)
*G06F 3/06* (2006.01)
*G06F 12/08* (2016.01)

(52) U.S. Cl.
CPC .......... *G06F 3/0613* (2013.01); *G06F 3/0647* (2013.01); *G06F 3/0689* (2013.01); *G06F 12/08* (2013.01)

(58) Field of Classification Search
None
See application file for complete search history.

(56) References Cited

U.S. PATENT DOCUMENTS

| | | | |
|---|---|---|---|
| 6,418,512 B1 * | 7/2002 | Goodgold | G06F 3/0607 711/114 |
| 8,443,241 B2 | 5/2013 | Chiu et al. | |
| 9,026,765 B1 * | 5/2015 | Marshak | G06F 3/061 711/114 |
| 2012/0278669 A1 * | 11/2012 | Chiu | G06F 12/02 714/700 |
| 2013/0312005 A1 | 11/2013 | Chiu et al. | |

* cited by examiner

*Primary Examiner* — Reginald G Bragdon
*Assistant Examiner* — Michael L Westbrook
(74) *Attorney, Agent, or Firm* — Griffiths & Seaton PLLC (57) ABSTRACT

Monitoring the division of input/output (I/O) loading within a storage system is provided where the storage system includes one or more storage devices and one or more ranks, each rank including a plurality of extents. The I/O loading of individual extents is estimated for each of the one or more ranks of the storage system by determining an average disk utilization in a rank, measuring a total heat for all extents in the rank, and based on the determined average disk utilization in the rank and the measured total heat for all extents in the rank, calculating a contribution of each extent to the utilization of the rank.

9 Claims, 5 Drawing Sheets

ESTIMATION OF PERFORMANCE UTILIZATION OF A STORAGE DEVICE

BACKGROUND OF THE INVENTION

Field of the Invention

The present invention relates in general to tiered storage systems, and more particularly, to utilization of storage devices in the tiered storage systems.

Description of the Related Art

Enterprise storage systems are used for improving performance and reliability while minimizing capital and operating cost. For this purpose, such systems use a mix of memory devices. For example, high performance hard disk drives (HDDs) and solid-state drives (SSDs) may be included in enterprise storage systems. However, although SSDs offer a high random access capability per gigabyte (GB) ratio, storage systems with only SSDs are still too expensive. On the other hand, the cost-effective performance of storage systems only including HDDs may be improved for most enterprise computing workloads.

To both reduce storage costs to an IT infrastructure and to meet performance requirements, storage tiering has been widely implemented. Storage tiering is a type of storage architecture that assigns different categories of data to different types of storage media. In particular, the data is categorized primarily on performance requirements, frequency of use, and levels of protection needed, and each category of data is stored on a particular type of storage medium. In some storage systems, such as multi-tier storage systems, a mix of storage device types may be included. For instance, the multi-tier storage system may include one storage tier employing SSDs to provide high performance storage and another storage tier including specific types of HDDs at a lower cost than SSD to provide lower performance to meet customer storage requirements. Examples of such tiering systems include commercial SSD-based multi-tier systems, e.g., IBM System Storage™ Easy Tier.

SUMMARY OF THE INVENTION

Currently, it is relatively difficult and expensive to estimate the throughput limitations of storage devices in the tiered storage systems under different workloads as the limitations not only depend on the storage devices themselves but also on workload categories. For example, in a commercial SSD-based multi-tier system such as the IBM System Storage™ Easy Tier system, calculations to obtain the performance statistics for different combinations of devices modes and workload types (e.g., read/write ratios, input/output (I/O) sizes, etc.) are needed in order to estimate the performance capability of the storage device. However, the calculations may not be sufficiently accurate to estimate the performance capability of such mixed workloads. As a result, the system may not improve performance sufficiently due to low utilization of the storage device and/or the system may become overloaded due to excessive utilization of the storage device.

Accordingly, a method is provided for monitoring the division of input/output (I/O) loading within a tiered storage system, the tiered storage system including one or more storage devices and one or more ranks, each rank including a plurality of extents. The method includes estimating for each of the one or more ranks of the tiered storage system the I/O loading of individual extents by determining an average disk utilization in a rank, measuring a total heat for all extents in the rank, and based on the determined average disk utilization in the rank and the measured total heat for all extents in the rank, calculating a contribution of each extent to the utilization of the rank.

Systems and a computer program product embodiments are also contemplated.

DETAILED DESCRIPTION OF THE DRAWINGS

To improve the estimation of throughput limitations of storage devices when the storage devices are under different workloads, a process is provided to dynamically manage workload distribution for a tiered storage system. In particular, the process takes into account device adapter rank utilization as a key index when determining whether a storage device is overloaded. In this regard, the device adapter rank utilization is used in the estimation of a performance contribution that an individual extent makes to the utilization of a target rank of a migration. In particular, based on the determined average disk utilization in the rank and a measured total heat for all extents in the rank, a contribution of each extent to the utilization of the rank is calculated. The calculated contribution can be compared with a rank utilization objective, which is a threshold value that avoids overloading of the target rank to thereby optimize performance of the storage device.

Figure 1:
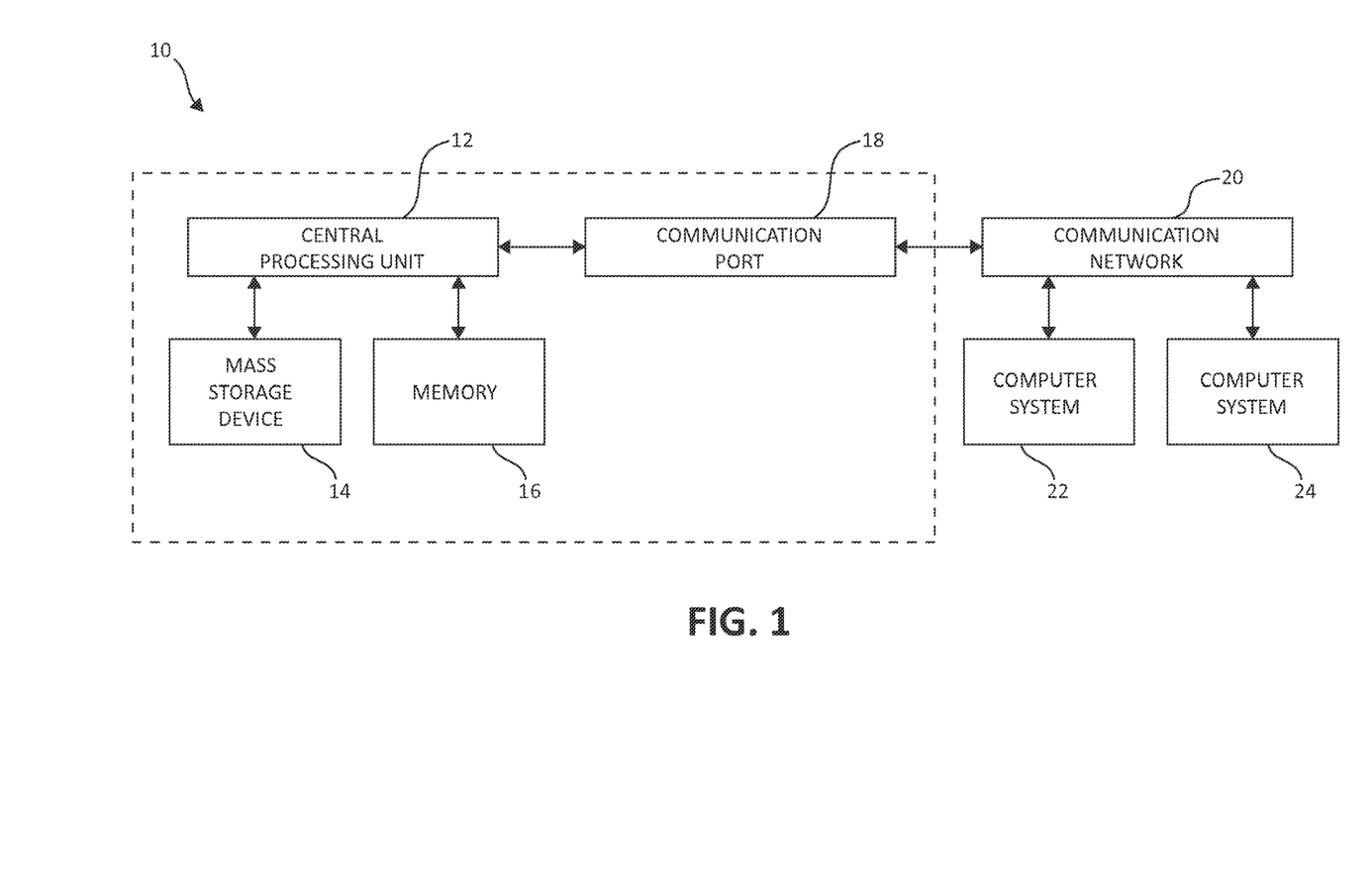
FIG. 1 illustrates a computer storage environment having an example storage device in which embodiments of the present invention may be realized.

Turning to FIG. 1, an example computer system 10 is depicted in which aspects of the present invention may be realized. Computer system 10 includes central processing unit (CPU) 12, which is connected to mass storage device(s) 14 and memory device 16. Mass storage devices can include hard disk drive (HDD) devices, solid state devices (SSD) etc., which can be configured in a redundant array of independent disks (RAID). The backup operations further described can be executed on device(s) 14, located in system 10 or elsewhere. Memory device 16 can include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24.

Figure 2:
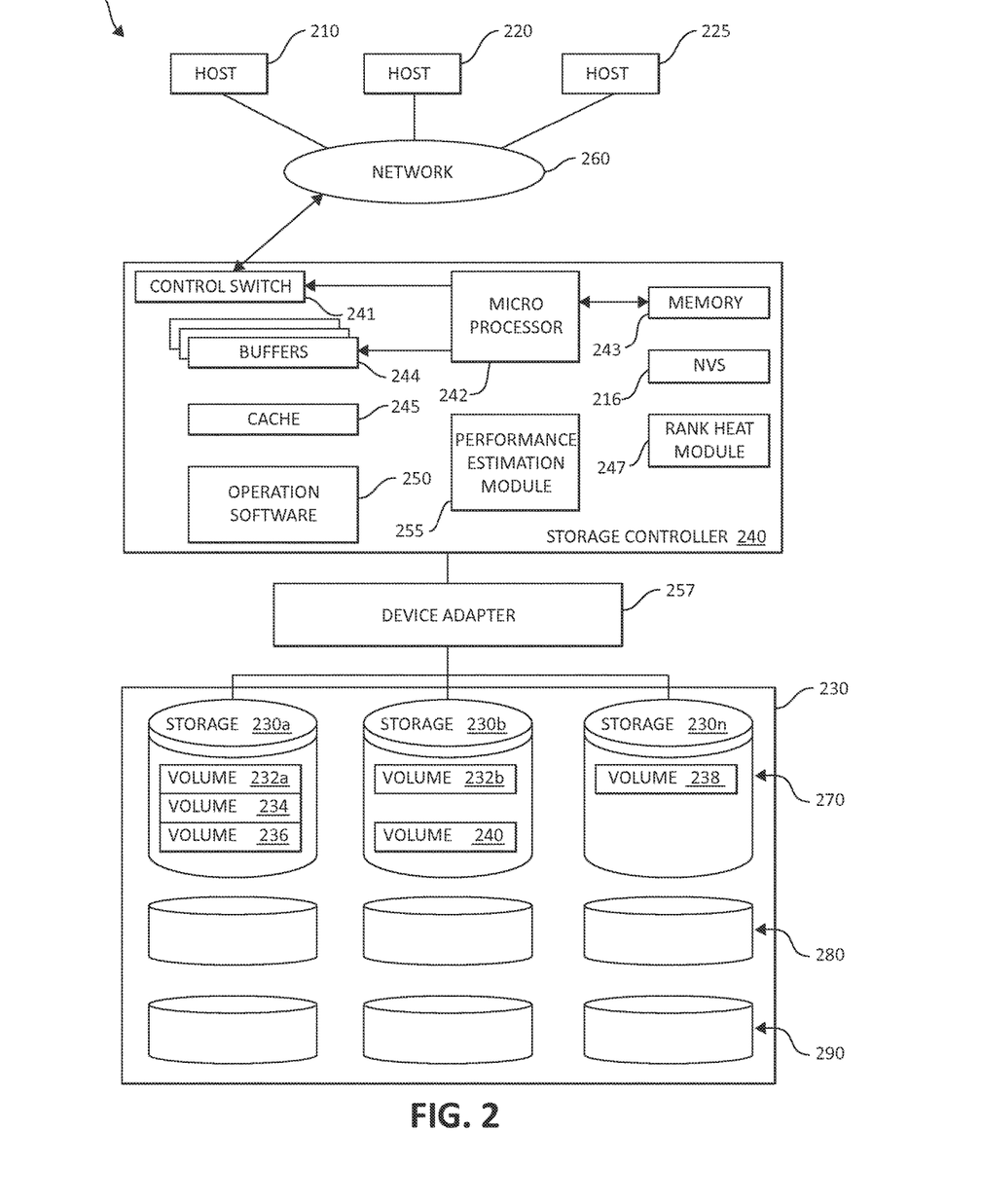
FIG. 2 illustrates an exemplary block diagram showing a hardware structure of a data storage system in a computer system in which embodiments of the present invention may be realized.

FIG. 2 is an exemplary block diagram showing a hardware structure of a data storage system 200 in a computer system according to the present invention. Referring to FIG. 2, there are shown host computers 210, 220, 225, each acting as a central processing unit for performing data processing as part of data storage system 200. Hosts (physical or virtual devices), 210, 220, and 225 may be one or more new physical devices or logical devices to accomplish the purposes of the present invention in data storage system 200. In one embodiment, by way of example only, data storage system 200 may be implemented as IBM® System Storage™ DS8000™. A Network connection 260 may be a fibre channel fabric, a fibre channel point to point link, a fibre channel over ethernet fabric or point to point link, a FICON (Fibre Connection) or ESCON (Enterprise Systems Connection) I/O interface, any other I/O interface type, a wireless network, a wired network, a LAN (local area network), a WAN (wide area network), heterogeneous, homogeneous, public (i.e. the Internet), private, or any combination thereof. Hosts, 210, 220, and 225 may be local or distributed among one or more locations and may be equipped with any type of fabric (or fabric channel) (not shown in FIG. 2) or network adapter 260 to communicate with storage controller 240, such as Fibre channel, FICON, ESCON, Ethernet, fiber optic, wireless, or coaxial adapters.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200.

Storage controller 240 further communicates with and manages storage 230 and facilitates the processing of write and read requests intended for storage 230. Storage 230 may be comprised of one or more storage devices, such as ranks, which are connected to storage controller 240 by a storage network. In some embodiments, the devices included in storage 230 may be connected in a loop architecture. System memory 243 of storage controller 240 stores program instructions and data which processor 242 may access for executing functions and method steps associated with managing storage 230 and executing the steps and methods of the present invention for estimating performance utilization of a storage device in a computer storage environment. In one embodiment, system memory 243 includes, is associated, or is in communication with operation software 250 for estimating performance utilization of a storage device in a computer storage environment, including the methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and nonvolatile memory and coupled to microprocessor 242 via a local bus (not shown in FIG. 2) for enhanced performance of data storage system 200. NVS 216 included in data storage controller is accessible by microprocessor 242 and serves to provide additional support for operations and execution of the present invention as described in other figures. NVS 216, may also be referred to as a "persistent" cache, or "cache memory" and is implemented with nonvolatile memory that may or may not utilize external power to retain data stored therein. NVS may be stored in and with cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices and may be arranged logical groupings of individual storage devices. In certain embodiments, storage 230 is comprised of JBOD (Just a Bunch of Disks) or a RAID (Redundant Array of Independent Disks). In an embodiment, storage 230 may be categorized into different tiers 270, 280, 290. Each tier 270, 280, 290 can include a different type of storage device. In an embodiment, storage 230 is set up as a hierarchical scheme. In this regard, a first storage tier, e.g. tier 270, with expensive high-quality media that provides fault tolerance and reliability (e.g., RAID6, SSD) may be used for mission-critical data. A second storage tier, e.g., tier 280, with cheaper and more conventional storage media (e.g., SATA) may be used for non-mission-critical data that is accessed infrequently. A third storage tier, e.g., tier 290, with high performance storage (e.g., FC) may be used for frequently accessed data. A fourth storage tier (not shown) with optical storage (e.g., tape storage) may be used to backup data from another storage tier.

Each tier may include a collection of storage ranks, which dissociates the physical storage from the logical configuration. The storage space in a rank may be allocated into logical volumes, which define the storage location specified in a write/read request. In one embodiment, by way of example only, storage system 200 as shown in FIG. 2 may include a logical volume, "which may have different kinds of allocations. Storage 230a, 230b . . . 230n are shown as ranks in data storage system 200, and are referred to herein as rank 230a, 230b . . . 230n. Ranks may be local to data storage system 200, or may be located at a physically remote location. In other words, a local storage controller may connect with a remote storage controller and manage storage at the remote location.

Ranks 230a, 230b . . . 230n can include one or more full or partial logical volumes. For example, rank 230a is shown configured with two entire logical volumes, 234 and 236, as well as one partial logical volume 232a. Rank 230b is shown with another partial logical volume 232b. Logical volume 232 is allocated across ranks 230a and 230b. Rank 230n is shown as being fully allocated to logical volume 238, and hence, rank 230n refers to the entire physical storage associated with logical volume 238. Logical volumes and ranks may further be divided into so-called "extents," which represent a fixed block of storage (e.g., 1 GB). An extent is therefore associated with a given logical volume and may be given a given rank.

To further the hierarchical scheme, ranks (e.g., ranks 230a, 230b . . . 230n) are arranged according to priority within each tier 270, 280, 290. In another example, logical volumes 232a, 234, 236, 232b, 240, 238 are arranged according to priority within each rank 230a, 230b . . . 230n. In accordance with an embodiment, logical volume 232a is a higher priority storage device than logical volume 234, logical volume 234 is a higher priority storage device than logical volume 236, and so on.

During operation of storage 230, the storage devices in ranks 230a, 230b . . . 230n may be subjected to varying workloads (low activity to heavy activity) and workload types. For instance, ranks 230a, 230b . . . 230n may receive workload types such as read/write commands, large or small input/output requests, random or sequential input/outputs, and the like, or alternatively, the storage devices may operate in different combinations of device modes (e.g., manual or automatic) and workload types. To optimize the use of logical volumes 232a, 234, 236, 232b, 240, 238 within storage 230, one or more of the extents within one or more of ranks 230a, 230b . . . 230n may be migrated (e.g., promoted or demoted) from one rank to another, or from one tier to another, based on whether the extent is "hot data" or "cold data." As is known by those with skill in the art, "hot data" or "hot extents" are data or extents that have more workload than other data in the same pool. "Cold data" or "cold extents" refer to data or extents that have low or no workload as compared to other data in the same pool.

To determine which extents are hot extents, and thus a candidate for migration, storage controller 240 includes a performance estimation module 255 and a rank heat module 247 to assist with estimating the performance utilization of a storage device, in a computer storage environment. Performance estimation module 255 and rank heat module 247 may work in conjunction with each and every component of storage controller 240, hosts 210, 220, 225, and storage devices 230. Both performance estimation module 255 and rank heat module 247 may be structurally one complete module working together and in conjunction with each other or may be individual modules. Performance estimation module 255 and rank heat module 247 may also be located in cache 245 or other components of storage controller 240 to accomplish the purposes of the present invention.

Performance estimation module 255 is configured to estimate the performance of the utilization of a device by estimating the contribution an extent makes to the utilization of its corresponding rank. In this regard, performance estimation module 255 receives a heat measurement of all of the extents in a given rank from rank heat module 247 and uses the measurement with an average disk utilization in a rank obtained from a device adapter 257 (described below) to calculate a value that is multiplied by the heat value of a target extent to determine the extent contribution. Rank heat module 247 continuously monitors the activity of the workload on data storage system 200 and maintains a heat map indicating heat distribution across a rank.

Storage controller 240 may be constructed with a control switch 241 for controlling the fiber channel protocol to host computers 210, 220, 225 and for controlling a protocol to control data transfer to or from storage devices 230, performance estimation module 255, and rank heat module 247 on which information may be set. Nonvolatile control memory 243 stores a microprogram (operation software) 250 for controlling the operation of storage controller 240, data for control and each table described later, cache 245 for temporarily storing (buffering) data, and buffers 244 for assisting cache 245 to read and write data. In an example, cache 245 stores the heat map that is maintained and updated by rank heat module 247.

As briefly noted above, by way of example only, the host computers or one or more physical or virtual devices, 210, 220, 225 and storage controller 240 are connected through network adaptor (this could be a fiber channel) 260 as an interface, i.e., via a switch called "Fabric." In one embodiment, by way of example only, the operation of the system shown in FIG. 2 will be described. Microprocessor 242 controls memory 243 to store command information from host device (physical or virtual) 210 and information for identifying host device (physical or virtual) 210. Control switch 241, buffers 244, cache 245, operating software 250, microprocessor 242, memory 243, NVS 216, performance estimation module 255, and rank heat module 247 communicate with each other and are separate or one individual component(s). Several, if not all of the components, such as operation software 245 are included with memory 243. In one embodiment, by way of example only, each of the components within the storage device are linked together and are in communication with each other for purposes suited to the present invention.

To connect storage controller 240 to storage 230, one or more device adapters 257 are included. In addition to connecting to storage 230, as briefly noted above, device adapters 257 monitor storage 230, and in particular, physical disks and ranks 230a, 230b . . . 230n, included in storage 230. In an embodiment, device adapters 257 collect data relating to I/O operations on the physical disks, such as a duration of the I/O operations, over a given interval of time. Device adapters 257 communicate the I/O operations data to performance estimation module 255, in an embodiment.

Figure 3:
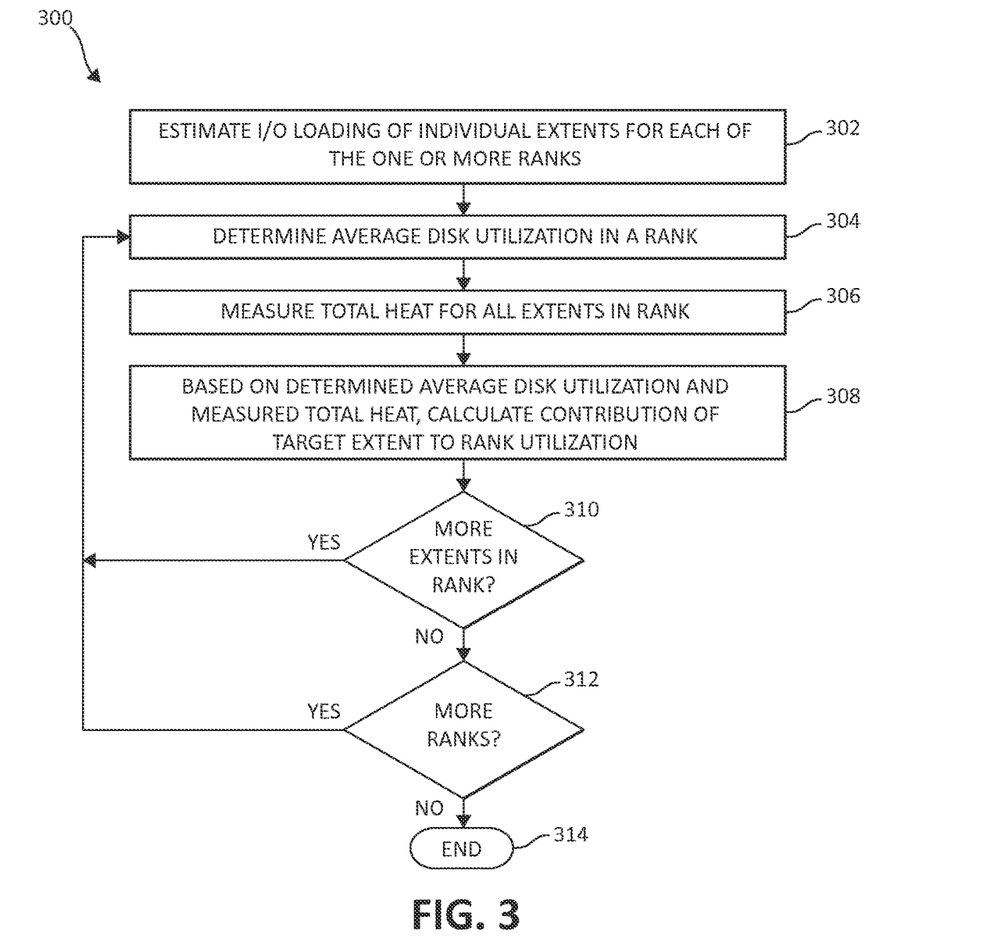
FIG. 3 is a flow diagram illustrating a method of estimating performance utilization of a storage device, according to an embodiment.

FIG. 3 is a flow diagram illustrating a method 300 to determine extent contribution to thereby identify the extents for migration, according to an embodiment. The illustrated embodiments operate to take into consideration all workload categories to thereby more precisely reflect overload on a storage device in order to improve action plan suggestions for migrating data from areas with too many hot extents to other areas without as many hot extents. As a result of the migration, overall system performance is improved. Moreover, even if device adapter 257 is not overloaded, method 300 can be used to detect one or more storage devices or disks that are connected to device adapter 257 that may be overloaded.

At step 302 of the method 300, the input/output (I/O) loading of individual extents for each of the one or more ranks of the data storage system 200 is estimated. In this regard, an average disk utilization in a rank is determined at 304. The average disk utilization in a rank with N disks is estimated based on an average population of outstanding requests against a given disk. In an embodiment, the data needed for computing the average disk utilization in the rank is collected by device adapter 257, and device adapter 257 computes the average disk utilization in the rank as well. In any case, a number of physical disks (D) used in a given operation is first obtained. Typically, the number of physical disks used for reads is equal to 1, while the number of disks used for writes is more than 1. For example, as shown in FIG. 2, reads may be performed on a single disk, while writes are made on two disks. Next, the number of disks (D) is used to determine L(D) by referring to a lookup table stored in memory 243, for example, or calculated as follows:

$$L(D)=D*[0.5+0.5/(1+\tfrac{1}{2}+\tfrac{1}{3}+ \ldots 1/D)]$$

After L(D) is obtained, the average disk utilization in a rank with N disks is estimated based upon the average population of outstanding requests against a given disk:

Accumulated Disk Loading=[Time of a Disk Operation]*$L(D)$ $P$=[Accumulated Disk Loading]/($N$*interval length)

$U=P/(1+P)$ where the "time of a disk operation" is a value obtained by device adapter 257, "N" is the total number of disks in a rank, and the "interval length" is a duration of time of a reporting interval to which device adapter 257 is set. "U" refers to the solved for average disk utilization in a rank.

The above-referenced formula is calculated by user-mode applications according to M/M/1 Model in Queueing Theory, based on raw performance statistics from drivers included in device adapters 257 at the bottom of data storage system 200. As such, the above-referenced formula more accurately reflects device status with a mixed workload, monitors workload within data storage system 200 and detects instant workload change therein as well.

In addition to determining the average disk utilization in a rank, a total heat for all extents in the rank ($H_{Total}$) is also measured at step 306. As noted above, rank heat module 247 continuously monitors and updates the heat measured in each rank. In an embodiment, rank heat module 247 uses a heat metric to calculate rank heat(s). For example, the heat metric includes the aggregate time waiting for an I/O response per unit of clock time for each extent, and the rank heat is obtained by taking a summation of the heat metric for all extents. Other methods for obtaining the total heat for all extents in the rank are employed in other embodiments.

Although illustrated as being performed simultaneously, step 304 may be performed prior or subsequent to step 306 in another embodiment.

Next, at step 308, based on the determined average disk utilization in the rank (U) and the measured total heat for all extents in the rank ($H_{Total}$), a contribution of a target extent ($X_T$) to the utilization of the rank is calculated as follows:

$$V=[U/(H_{Total})]$$

Contribution of $X_T = V * \text{Heat}(X_T)$

Steps 304, 306, and 308 are then repeated for each extent in the rank at 310. If no extents remain in the rank, method 300 moves to step 312. At 312, a determination is made as to whether a next rank is present in data storage system 200. If so, method 300 repeats steps 304, 306, and 308 for each extent in the next rank and so on until all extents in all ranks have been examined.

Figure 4:
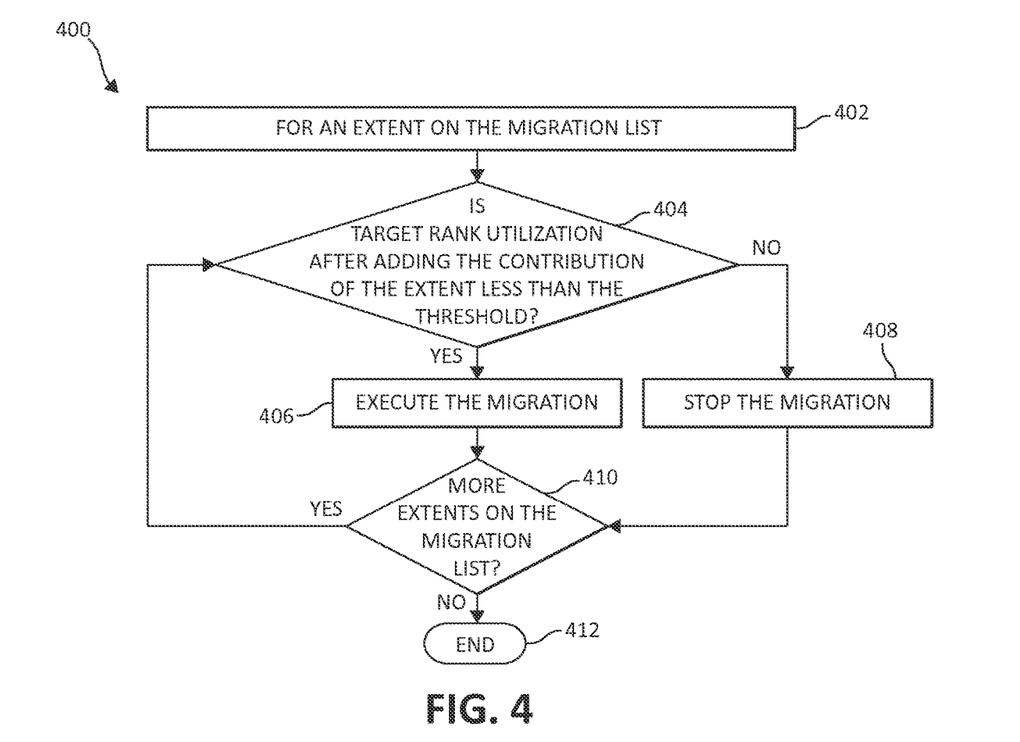
FIG. 4 is a flow diagram illustrating a method of using the estimated performance utilization of a storage device to determine placement of hot extents, according to an embodiment.

The calculation of contribution of the extents to the utilization of all of the ranks is taken into account in developing a new migration plan. The migration plan can take a variety of forms. For example, the migration plan may include the migration of hot extents to faster storage, the migration of colder extents to slower storage, or the correction of conditions in which ranks are overutilized. In an embodiment in which an assumption is made that one or more target extents ($X_T$) has been identified for migration, without describing in detail the selection of the target extents, FIG. 4 is a flow diagram illustrating a method 400 for checking a proposed migration plan to ensure that the migration plan will not result in overutilizing any rank based upon the available measurements, according to an embodiment. Method 400 accomplishes the aforementioned purpose by determining the effect of adding the utilization associate with the target extent ($X_T$) to the current measured utilization of the target rank. In an embodiment, an extent on a migration list is examined at 402. Next, a determination is made as to whether a target rank utilization after adding the contribution of the target extent is less than a threshold at 404. If the resulting total rank utilization does not exceed a predetermined threshold, then the target extent ($X_T$) may be migrated as planned at 406; otherwise, the migration should be omitted from the migration plan at 408. The threshold value may be about 80%, in an embodiment. In another embodiment, the threshold value is above about 80%, or alternatively, the threshold value is below about 80%. In both cases, method 400 moves to step 410 to determine whether more extents are identified on the migration list, and if so, performing step 402 on extents stored on the other devices. After all extents on the migration list are examined, method 400 ends at 412.

The data produced as shown in FIG. 3 can also be used to identify the presence of an overloaded rank and correct that condition when it occurs. These data permit the overloaded rank to be identified, allow a list of the extents which should be moved off of the rank to be developed, and identify the ranks that are not overloaded, and to which the extents can be moved.

The data produced as shown in FIG. 3 can further be used to promote improved balance of I/O load among storage devices. This can be accomplished through a sequence of extent migration plans constructed expressly to reduce disparities in rank utilization. For example, one such plan might identify a set of extents which, if moved from the rank with the highest utilization to that with the lowest utilization, would result in reducing or eliminating the disparity between the two ranks.

Figure 5:
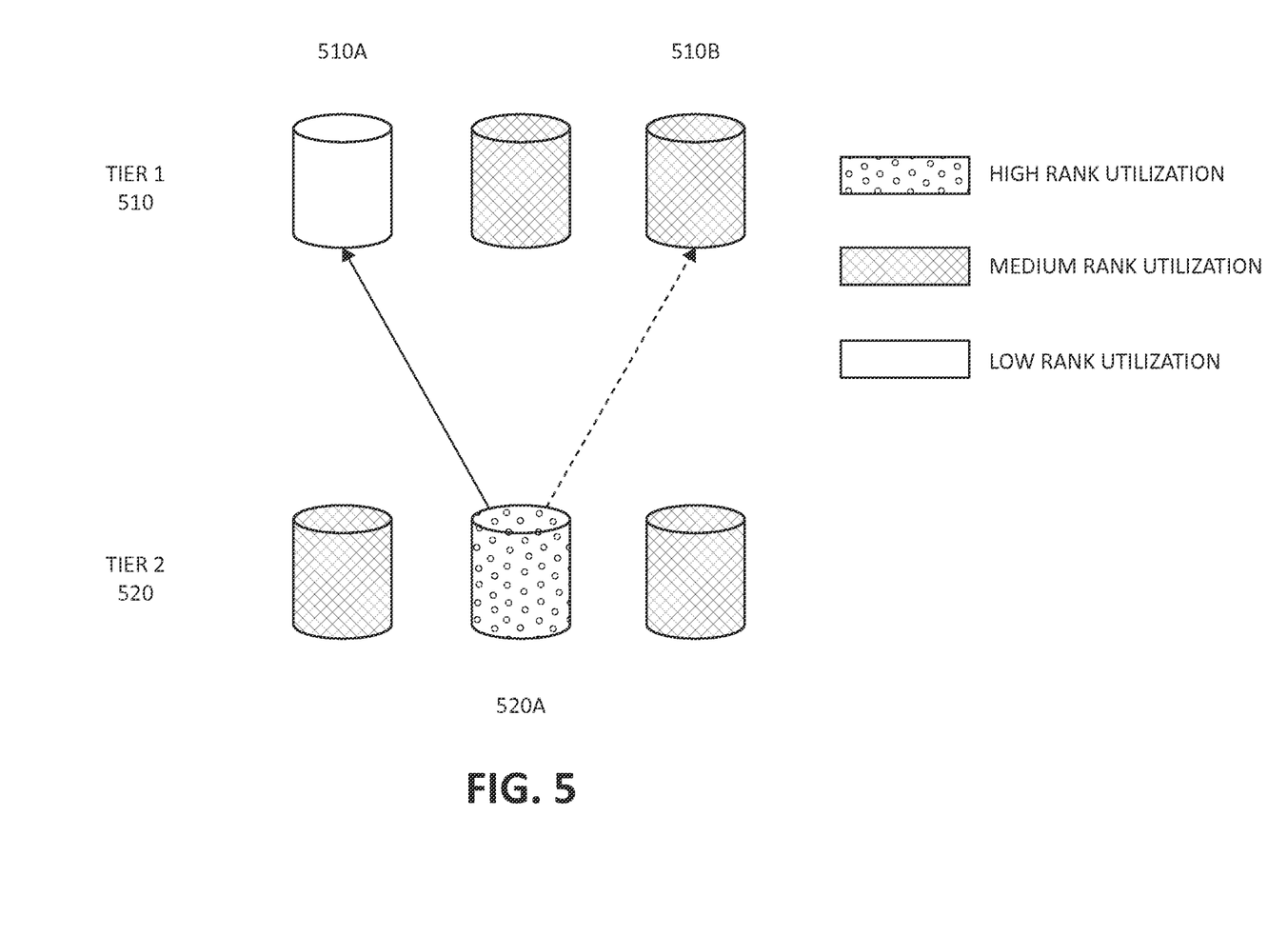
FIG. 5 is a simplified block diagram of a storage system on which a step of the method depicted in FIG. 4 is being performed, according to an embodiment.

In an embodiment, the data produced as shown in FIG. 3 can be use to optimize the selection of a target rank for an extent to move to. The target rank can be the rank with lowest rank utilization in the same tier or within the managed pool. A simplified diagram in FIG. 5 shows an example of target rank selection. In an embodiment in which the threshold value is about 80%, ranks shown in dotted pattern have high utilization, for example equal to or higher than 80%. The ranks shown in hatched pattern have medium utilization, for example between 40%-80%, and the ranks shown in clear pattern have low rank utilization, for example, less than 40%. When a hot extent in rank 520A in a slower tier2 520 needs to be moved to a rank in higher tier1 510, the preferred target rank would be rank 510A that has low rank utilization, instead of other ranks, for example rank 510B.

By employing the above-described process for estimating the performance utilization of a storage device, management of mixed workloads improves due to the increased accuracy in determining performance contribution of each extent to the utilization of a particular rank. As a result, overloading of ranks may be prevented and overall performance may be improved.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of monitoring the division of I/O (input/output) loading within a storage system by a processor device, the storage system including one or more storage devices and one or more ranks, each rank including a plurality of extents, the method comprising:
   estimating, by the processor device, for each of the one or more ranks of the storage system the input/output (I/O) loading of individual extents by:
      determining an average disk utilization in a rank;
      measuring a total heat for all extents in the rank using a heat metric, the heat metric including an aggregate time waiting for an I/O response per unit of clock time for each of the extents in the rank, wherein a rank heat is obtained by taking a summation of the heat metric for all extents in the rank; and
      based on the determined average disk utilization in the rank and the measured total heat for all extents in the rank, calculating a contribution of each extent to the utilization of the rank;
   selecting, by the processor device, a target storage device for migration of one or more of the extents in a rank, based on the calculated contribution of each extent to the utilization of the rank such that a resulting utilization effect of adding the migrated one or more of the extents in the rank to a target rank in the target storage device is determined prior to performing the migration as developed in a migration plan; wherein if the resulting utilization effect is determined to be below a predetermined threshold, the migration is subsequently performed as planned in the migration plan; and if the resulting utilization effect is determined to be above the predetermined threshold, the migration is omitted from the migration plan;

detecting, by the processor device, whether the one or more storage devices is overloaded, based on the calculated contribution of each extent to the utilization of the rank, wherein the rank is included as part of a plurality of ranks in a tier of a plurality of tiers of the storage system; and when the one or more storage devices is overloaded, automatically re-balancing, by the processor device, the workload over one or more other devices across the plurality of tiers and among the plurality of ranks within the tier, based on the calculated contribution of each extent to the utilization of the rank.

2. The method of claim 1, further comprising:
if the one or more storage devices is overloaded, triggering an instant protection mechanism on the one or more storage devices.

3. The method of claim 1, further comprising:
determining whether one or more other storage devices in the rank connected to the one or more storage devices are not overloaded, in response to a determination that overload protection is needed.

4. A storage system including:
one or more storage devices, including one or more ranks, each rank including a plurality of extents; and
a processor device coupled to the one or more storage devices, the processor device:
estimating for each of the one or more ranks of the tiered storage system the input/output (I/O) loading of individual extents by:
determining an average disk utilization in a rank;
measuring a total heat for all extents in the rank using a heat metric, the heat metric including an aggregate time waiting for an I/O response per unit of clock time for each of the extents in the rank, wherein a rank heat is obtained by taking a summation of the heat metric for all extents in the rank; and
based on the determined average disk utilization in the rank and the measured total heat for all extents in the rank, calculating a contribution of each extent to the utilization of the rank;
selecting a target storage device for migration of one or more of the extents in a rank, based on the calculated contribution of each extent to the utilization of the rank such that a resulting utilization effect of adding the migrated one or more of the extents in the rank to a target rank in the target storage device is determined prior to performing the migration as developed in a migration plan; wherein if the resulting utilization effect is determined to be below a predetermined threshold, the migration is subsequently performed as planned in the migration plan; and if the resulting utilization effect is determined to be above the predetermined threshold, the migration is omitted from the migration plan;
detecting, by the processor device, whether the one or more storage devices is overloaded, based on the calculated contribution of each extent to the utilization of the rank, wherein the rank is included as part of a plurality of ranks in a tier of a plurality of tiers of the storage system; and
when the one or more storage devices is overloaded, automatically re-balancing, by the processor device, the workload over one or more other devices across the plurality of tiers and among the plurality of ranks within the tier, based on the calculated contribution of each extent to the utilization of the rank.

5. The storage system of claim 4, wherein the processor further is:
if the one or more storage devices is overloaded, triggering an instant protection mechanism on the one or more storage devices.

6. The storage system of claim 4, wherein the processor further is:
determining whether one or more other storage devices in the rank connected to a first storage device are not overloaded, in response to a determination that overload protection is needed.

7. A computer program product for monitoring a workload of a storage system by a processor device, the storage system including one or more storage devices and one or more ranks, each rank including a plurality of extents, the computer program product comprising a computer-readable storage medium having computer-readable program code portions stored therein, the computer-readable program code portions comprising:
computer code for estimating, by the processor device, for each of the one or more ranks of the storage system the input/output (I/O) loading of individual extents by:
determining an average disk utilization in a rank;
measuring a total heat for all extents in the rank using a heat metric, the heat metric including an aggregate time waiting for an I/O response per unit of clock time for each of the extents in the rank, wherein a rank heat is obtained by taking a summation of the heat metric for all extents in the rank; and
based on the determined average disk utilization in the rank and the measured total heat for all extents in the rank, calculating a contribution of each extent to the utilization of the rank;
computer code for selecting, by the processor device, a target storage device for migration of the one or more extents in a rank, based on the calculated contribution of each extent to the utilization of the rank such that a resulting utilization effect of adding the migrated one or more of the extents in the rank to a target rank in the target storage device is determined prior to performing the migration as developed in a migration plan; wherein if the resulting utilization effect is determined to be below a predetermined threshold, the migration is subsequently performed as planned in the migration plan; and if the resulting utilization effect is determined to be above the predetermined threshold, the migration is omitted from the migration plan;
computer code for detecting, by the processor device, whether the one or more storage devices is overloaded, based on the calculated contribution of each extent to the utilization of the rank, wherein the rank is included as part of a plurality of ranks in a tier of a plurality of tiers of the storage system; and
computer code for, when the one or more storage devices is overloaded, automatically re-balancing, by the processor device, the workload over one or more other devices across the plurality of tiers and among the plurality of ranks within the tier, based on the calculated contribution of each extent to the utilization of the rank.

8. The computer program product of claim 7, further comprising:
computer code for, if the one or more storage devices is overloaded, triggering an instant protection mechanism on the one or more storage devices.

9. The computer program product of claim 7, further comprising:
    computer code for determining whether one or more other devices in the rank connected to a storage device are not overloaded, in response to a determination that overload protection is needed.

\* \* \* \* \*